United States Patent [19]

Booe

[11] 3,783,480
[45] Jan. 8, 1974

[54] METHOD OF MAKING A CAPACITOR
[75] Inventor: James M. Booe, Indianapolis, Ind.
[73] Assignee: P. R. Mallory & Co. Inc., Indianapolis, Ind.
[22] Filed: Mar. 9, 1972
[21] Appl. No.: 233,252

[52] U.S. Cl.................. 29/25.42, 156/3, 317/258
[51] Int. Cl............................................ H01g 13/06
[58] Field of Search.................. 317/258, 260, 261; 29/25.42

[56] References Cited
UNITED STATES PATENTS
| | | | |
|---|---|---|---|
| 1,173,452 | 2/1916 | Meirowsky | 317/261 |
| 2,520,173 | 9/1950 | Sanders | 317/260 |
| 2,590,650 | 3/1952 | Robinson | 317/258 |
| 3,260,904 | 7/1966 | Booe | 317/258 |

FOREIGN PATENTS OR APPLICATIONS
| | | | |
|---|---|---|---|
| 159,141 | 9/1954 | Australia | 317/260 |
| 163,725 | 6/1955 | Australia | 317/260 |

Primary Examiner—E. A. Goldberg
Attorney—Richard H. Childress, Charles W. Hoffmann & Robert F. Meyer

[57] ABSTRACT

Improved capacitors employing metal foil electrodes having polymeric dielectric coatings thereon are described for use at operating voltages up to moderately high values such as 1,000–2,000V of either AC or DC. A bonding agent is used to bond together adjacent dielectric coatings, and an edge clearing technique is used to recess the edge of alternate electrodes on each side of the device.

21 Claims, 13 Drawing Figures

PATENTED JAN 8 1974 3,783,480

METHOD OF MAKING A CAPACITOR

BACKGROUND

Although dielectric coated foil capacitors are in the prior art, they have had only limited success due largely to the problems of low breakdown voltage, low degree of physical integrity, corona problems at the higher voltages, difficulty with lead attachment to the electrode foils, high inductance, limited environmental characteristics, etc.

Similar capacitors of this general type employ discrete films as dielectric. These have many of the shortcomings as given above. In addition, it is not feasible to obtain discrete film dielectrics in very thin sections particularly below about 0.00025 inch. Even in this thickness, the cost is rather high compared to the thicker films such as 0.0005 inch. Also, the thinnest films commercially available usually have a relatively large number of imperfections such as conducting particles, pinholes, etc., and to at least partly overcome the effect of these imperfections, a plurality of films are used between the electrodes. The winding of very thin film capacitors is a problem primarily because of the number of fragile members to be handled, such as two very thin aluminum foils, plus at least two, and frequently four or even six, film members. Not only is breakage a problem, but there is also the problem of maintaining good alignment during winding.

OBJECTS

It is an object of the present invention to provide capacitors having low corona.

It is another object of the present invention to provide capacitors having high breakdown voltage.

It is another object of the present invention to provide capacitors having low inductance.

It is another of the present inventions objects to provide a method of making capacitors wherein fewer members must be wound.

It is another object of the present invention to provide capacitors having good alignment during winding.

It is another object of the present invention to provide a novel edge clearing method.

Another object of the present invention is to provide capacitors having broad temperature range capability.

Another object of the present invention is to provide capacitors having good radiation resistance.

Another object of the invention is to provide capacitors having good lead attachment means.

Another object of the invention is to provide capacitors which will withstand repeated thermal shock.

Another object is to provide a rigid capacitor instruction which will withstand severe mechanical shock and vibration.

Another object is to provide increased electrode strength to better withstand assembly into capacitors by winding.

Another object of the present invention is to provide capacitors which have good properties and are produced at low cost.

Other objects will be apparent from the following description and drawings.

THE DRAWINGS

SUMMARY OF THE INVENTION

Figure 10:
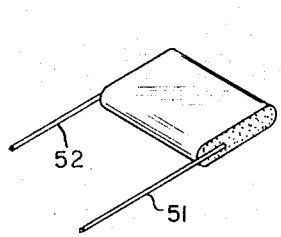
FIGS. 10 and 11 are views of the capacitors of the present invention after they have been manufactured.

Thin metal foil, such as aluminum is coated with the desired thickness of a polymeric dielectric, preferably from a solution of the polymer. After drying, the composite is slit into long lengths. Each strip is subjected to an "edge-clearing" process whereby one edge of the foil is dissolved from between the coatings to a depth of a small fraction of an inch. Capacitor winding may be made from two such strips with the cleared edge on opposite sides by any of the three methods:

1. wind dry and vacuum impregnate with a solventless bonding agent capable of being converted to a solid;

2. Apply a thin coating of a fusible bonding agent to the dielectric coated foil and wind the two strips together, followed by application of heat to fuse the bonding agent;

3. Wind two strips together with a solventless liquid bonding agent which can be subsequently converted to a solid.

In any of the three methods, the windings may be radially pressed between heated platens to remove the excess bonding agent and convert to a solid that portion which remains within or on the winding.

The hardened excess material is trimmed from the ends of the winding to expose the uncleared foil edges leaving the alternate cleared edges covered with the bonding agent.

A terminating metallization coating is applied to the exposed electrode edges.

DETAILED DESCRIPTION

The capacitor construction of this invention makes improved use of certain polymer dielectrics which can be applied to the electrode foils as a solution of the polymer, later to be dried and cured to relatively thin coatings tightly bonded to the electrode.

There are several requirements for the dielectric coating material to adequately serve for this purpose. The main requirements are as follows:

1. Should have high dielectric strength, preferably in the range of 3,000 to 7,000 volts per mil or higher.
2. Should have a reasonably low dissipation factor, preferably under 0.005.
3. The dielectric constant should be preferably above about 2.5.
4. Should have high insulation resistance, preferably above about $10^{15}$ ohm-cm.
5. Electrical properties should not change greatly with frequency.
6. Electrical properties should not change greatly with temperature.
7. The material should be adaptable to application to the electrode foil from a solution to give a controlled coating.
8. Film coatings applied to electrodes are preferably (1) relatively adherent, (2) relatively uniform in thickness, and (3) have relatively few imperfections, such as conduction sites and pinholes.
9. The coating preferably should withstand temperatures of above about 125°C for long periods of time without undue chemical, physical or electrical change, if operating at such temperature is contemplated.
10. The coating preferably should be tough to add strength to the electrode foil and to withstand winding around small diameter mandrels if such mandrels are used, and at the same time have sufficient flexibility for such winding.
11. The coating should withstand high temperatures during processing of the foil and the capacitor, including that required by application of, and curing or fusing of, the bonding agent.
12. The coating must not be appreciably adversely affected by the bonding agent, for example, it should not be fused by or dissolved by the bonding agent.
13. For some applications, the coating is preferably radiation resistant.
14. The coating should be sufficiently chemically resistant to withstand the edge clearing operation.

By employing one or more of the various known ways of applying a polymer coating to the electrode foils, for example, by (a) spraying, (b) electrostatic coating, (c) roller coating, (d) doctor blade coating, (e) dip coating, virtually any desired practical thickness of the resulting coating can be obtained. There is, therefore, a greater choice of dielectric thickness over that of purshased discrete films.

Figure 1:
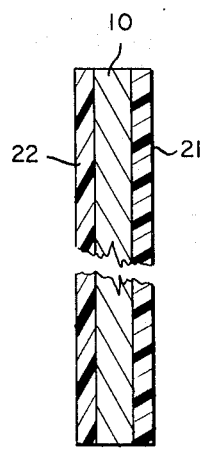
FIG. 1 is a view of capacitor foil after it has been coated on both sides with a dielectric coating and has been slit at two edges to expose the foil at these edges.

In FIG. 1, an electrode foil 10 is shown coated on both sides with dielectric coatings 21 and 22.

There is the choice of coating either one or both electrode foils. For low voltage applications, it may suffice to use only one coated foil with one bare foil. However this requires a slightly different technique in the winding operation to provide for one edge of the bare foil to be recessed. This technique includes offset winding so that the edge of the bare foil is inset adjacent to the uncleared edge of the coated foil.

For higher voltage applications, a dielectric coating on both foils is by far the best procedure since it provides for two dielectric layers plus the residual bonding agent between. Two thin dielectrics will withstand a higher voltage than one dielectric having a thickness equal to the sum of the two thin ones.

Of the various methods of coating foils, perhaps the dip coating method yields a more controlled thickness of the coating except at the edges of the foil. Sometimes, the coating does not cover the edge appreciably, and, also, there is some pulling away of the film from the edge during the drying operation and a slight ridge in the coating a small fraction of an inch in from the edge may occur which is undesirable for several reasons.

It is generally preferred to coat wide widths of foil, perhaps a few to several inches wide, and then gang slit this to the widths required by the capacitor size. The two edges are discarded to avoid the irregular coating. Coated foils produced in this manner insure uniformly exposed foil edges which facilitates dissolving one edge away in a controlled manner, as described hereinafter.

As stated previously, the winding of discrete very thin foils and films requires great care and good equipment to prevent breakage, especially of the foil. In the case of the coated foil, the physical integrity is far greater than that of bare foil. Even with coating as thin as 0.00015 inch of polyimide on each side, the tensile strengths and tear strengths are very much greater than that of bare foil. This, coupled with other improvements in the physical properties, makes for easy winding of capacitors.

Yet another feature of this invention is the simplicity of winding the units in that only two members are wound instead of the usual four, six or even eight members with discrete foils and films. Perhaps of equal importance is the fact that precise alignment is easy to accomplish. Both members are wound in near exact juxtaposition, thus "stagger" or offset winding is obviated. This is possible since the recessed edge of one coated foil is located at one end of the winding and the recessed edge of the other member is at the other end. The winding is particularly easy where the coated foils have a thin coating of bonding agent on the surface because this supports or strengthens the overhanging edges of the dielectric coatings where the edge of the foil has been dissolved away.

In accordance with the present invention, it has been found that a wide variety of polymeric substances and resins may be successfully employed as the dielectric coating material. These fall into the broad groups, thermoplastic polymers and thermoseting polymers. As is known by those skilled in the art, the mechanism of polymerization is either addition and/or condensation of one or more monomers. The polymeric materials discussed herein will fall into these broad classifications. Some thermoplastic polymers are obtained, as is well known, by polymerizing unsaturated monomers via free-radical, cationic, anionic or organametallic coordination catalysts leading to atactic, isotactic or syndiotactic polymers or mixtures thereof; or other stereoregular polymers, such as the *cis* or *trans* isomers of e.g. poly (butadiene). It is possible to make block or graft polymers also, according to well-known methods, which have varying properties. It is also possible, as is well-known, to cross-link many of these materials, e.g. polybutandienes giving a thermoset product.

Representative examples are the homologous series of poly (ethylene), poly(propylene), —, poly(1-octene), etc.; structural isomers such as poly(isobutene) and poly(butene-1); and a wide variety of copolymers thereof. Other examples are the vinyl, vinylidene, vinylene, acrylic, methacrylic, and cyanoacrylic series (see below) and copolymers thereof.

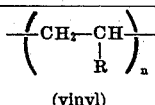
(vinyl)

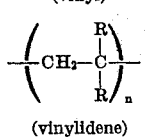
(vinylidene)

R may be any of the groups known to those skilled in the arts; e.g. —H; alkyl, aryl, alkaryl, aralkyl and substituted alkyl, aryl, alkaryl, aralkyl groups; halides; hydroxyl; ether groups; carboxyl; ester groups; cyano; heterocyclic groups; etc.
For example R = —CH$_2$CH$_3$, —C$_6$H$_5$, —CH$_2$C$_6$H$_5$, —C$_6$H$_5$CH$_3$, —Cl, —OH, —OCH$_3$, —COOH, —COOCH$_3$, —CN,

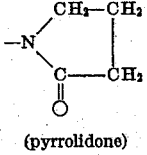
(pyrrolidone)

In the case of vinylidene monomers, some of the above R groups will not serve as well as others due to steric hindrance and/or electronic considerations.

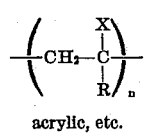
acrylic, etc.

Some examples of the subgroups within the acrylic "family" are:

X = —H acrylic
= —CH$_3$ methacrylic
= —CN cyanoacrylic
= —Cl chloroacrylic

Others are possible as is well known to those skilled in the art. R, e.g. may be —COOR'; —CONR'$_2$ where —R' is —H; alkyl, aryl; alkaryl, aralkyl or substituted alkyl, alkaryl, aralkyl and aryl group.

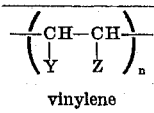
vinylene

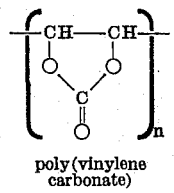
poly(vinylene carbonate)

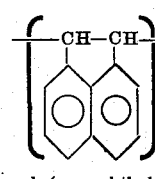
poly(acenaphthylene)

Vinylene monomers differ structurally from the vinylidene in that the two substituents are attached to adjacent carbon atoms rather than the same carbon atom. Substituent Y may be the same or different than Z. Some examples of suitable groups were given above as X. Again, not all groups will permit polymerization, as is well known to those skilled in the art. Also, the Y and Z groups may represent one substituent as is shown for vinylene carbonate and acenaphthylene.

Also, wide varieties of copolymers of the above may be prepared.

In addition to the use of polymers *per se*, it is also possible to apply monomers, or mixtures thereof, to the structure, followed by subsequent polymerization *in situ*. Further, plastic masses of mixtures of polymers and monomers may be employed, followed by subsequent polymerization of the monomer portion.

Another technique of polymer application comprises the use of the well-known plastisols or organosols, wherein the polymer is dispersed in a plasticizer or weak solvent, which is subsequently fused into a homogeneous mass.

Of particular value are the excellent dielectric polymers derived from aromatic groups attached to the carbon chain: for example, polymers and copolymers of styrene; styrene derivatives such as vinyltoluene, alpha-methylstyrene, mono-, di- or poly-alkyl or -aryl styrenes, chlorostyrenes, dichlorostyrenes, and other halo substituted styrenes, cyanostyrenes, nitro-styrenes, and the like; vinylbiphenyls; vinylnaphthalenes, vinylterphenyls; vinylfluorenes, 9-methylenefluorene; vinylphenanthranes; vinylpyrenes; vinyldibenzofuranes; vinylcarbazoles; vinylphenoxathiins; and the wide variety of other similar monomers well known to those skilled in the art. Still other examples are polymers and copolymers of butadiene, isoprene, chloroprene, 4-methylpentene-1, and the like; tetrafluoroethylene, vinylidene fluoride, hexafluoropropylene and the like, modified polymers such as polyvinylformal, -acetal, -butyral, and the like; as well as the so-called "spontaneous free radicals" polymers of poly(paraxylyene), its derivatives and the like.

It should be noted at this point that not all the above polymers are suitable for all uses, but each is suitable within its limitations. For example, if one wants a high dielectric consant, many of the acrylic and cyanoacrylic polymers will be usable, but many of the same will give a high loss factor, so the application must permit of this. If the device is to be used near room temperature and lower, all the above will prove satisfactory, but obviously one would not use polyethylene, for example, in a capacitor designed for use at 150°C. Many of the aromatic polymers discussed above will give the lowest loss factors (DF < 0.001) and some offer high temperature resistances, but they have low dielectric constants. Thus, the use of any polymer must be matched with its intended application.

While thermoplastics are somewhat limited in temperature capability, due to their good electrical properties they can be employed as a dielectric coating providing a bonding agent is selected which does not require processing temperatures so high that this dielectric coating is adversely affected. Applicable bonding agents are certain silicon materials and low curing temperature epoxy resins, which can be cured preferably below 150°C.

Condensation polymers are prepared by well known techniques and include polyesters; polyamides; polyester-amides; polyurethanes; polycarbonates; condensations of formaldehyde with phenol, resorcinol, melamine, urea, and the like; phenoxy resins; polyphenylene; polyphenyleneoxide; polyphenylenesulfide; polydiphenyleneoxide; polysulfones and copolymers thereof, and the like; and copolymers with each of the above with each other. Some examples are depicted below:

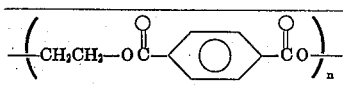

poly(ethyleneterephthalate)

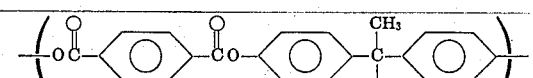

an aromatic polyester

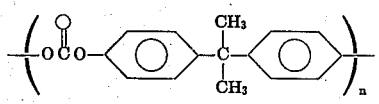

polycarbonate of 2,2 bis(4-hydroxy phenyl) propane (Polycarbonate I)

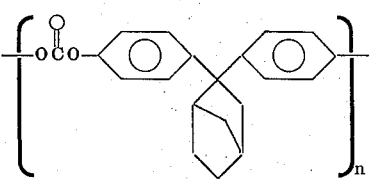

polycarbonate of 2,2 bis(4-hydroxy phenyl) norbornane (Polycarbonate II)

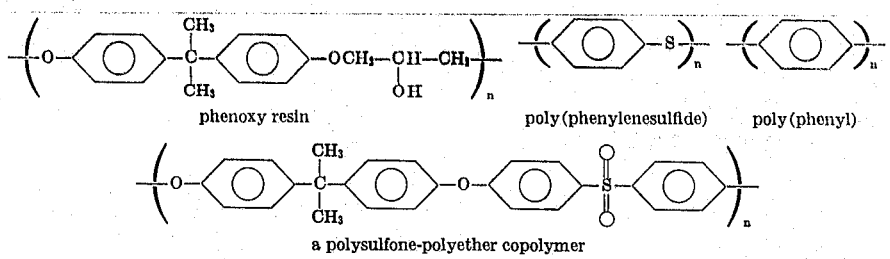

phenoxy resin    poly(phenylenesulfide)    poly(phenyl)

a polysulfone-polyether copolymer

Cellulosic polymers should be recommended with discretion. They have high dielectric constants but, in general, have high dissipation factors and limited temperature capabilities, depending upon substituents. Some of the commercially available derivatives of value, when used within their limitations, are: the cellulose esters, such as -acetate and -butyrate; cellulose ethers, such as methyl- and ethyl-cellulose; hydroxeyethyl-, and carboxymethyl-cellulose.

Polyethers have the general formula $(-R-O)_n$, where R may be aliphatic, cycloaliphatic, aryl, alkaryl, aralkyl, and derivatives thereof. These are prepared by several mechanisms including condensation and ring opening reactions. Of the following examples: poly(ethyleneoxide), poly(propyleneoxide), poly(formaldehyde), poly(oxetane and its derivatives, and poly(cylohexaneoxide) use ring opening mechanisms; while poly(2,6-dimethylphenyleneoxide) is formed by a type of condensation reaction.

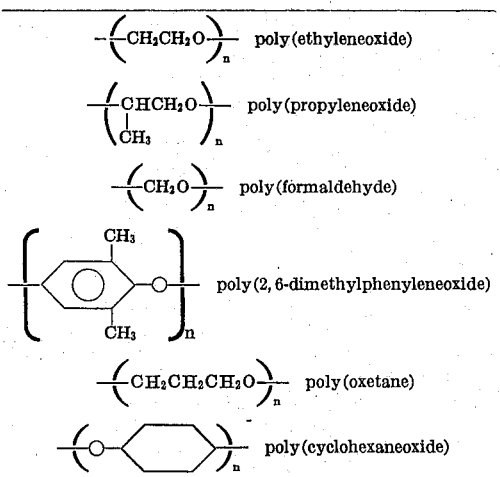

Many of the newer polymers, available commercially or on a developmental scale, possess heterocyclic linkages in the chain. Most of these have excellent electrical properties and extremely high temperature capabilities. One type is a polyimide. It can be supplied as a polyamic resin solution, which upon removal of solvent and heating converts to a polyimide by the elimination of water. This is shown below as a preparation from pyromellitic dianhydride and bis(4-aminophenyl) ether, with subsequent conversion to a polyimide.

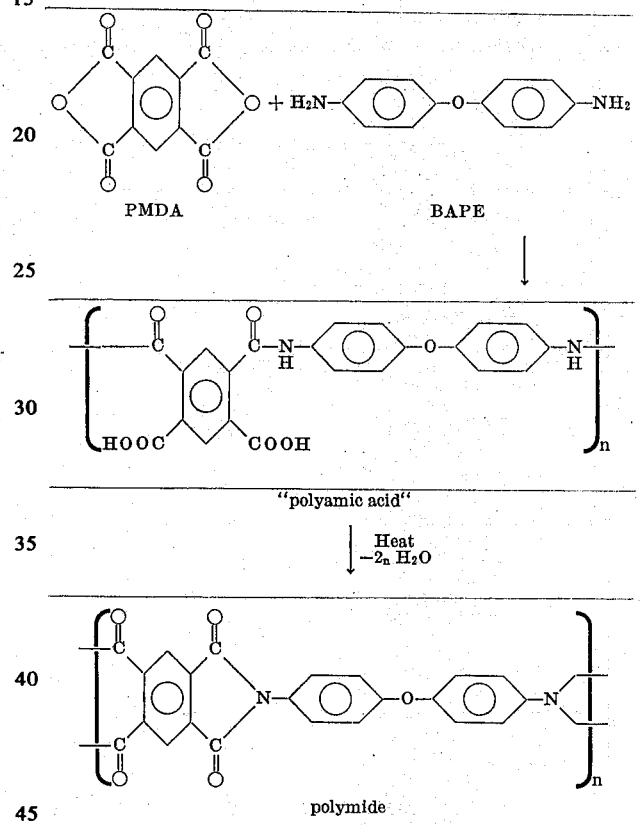

A wide variety of properties can be obtained by varying the dianhydride, the diamine, or the processing conditions.

Other properties can be obtained by selecting somewhat similar polymers, such as polyamide-imides and polyester-imides. Here too, properties will vary widely depending upon the amine and anhydride employed. Representative examples are given below.

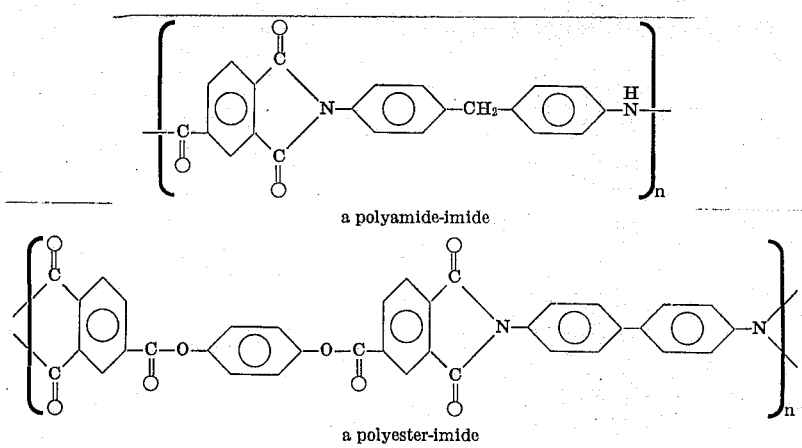

Heterocyclic rings other than imide are incorporated into polymers, again usually to give high temperature resistance and good electrical properties. Examples are the polyimidazoles, polythiazoles, polyoxazoles, polyoxadiazoles, polythiadiazoles, polytriazoles, polytetraazopyrenes, polyquinoxalines, polyimidazopyrrolones and the like, including polymer chains containing two or more of the above linkages.

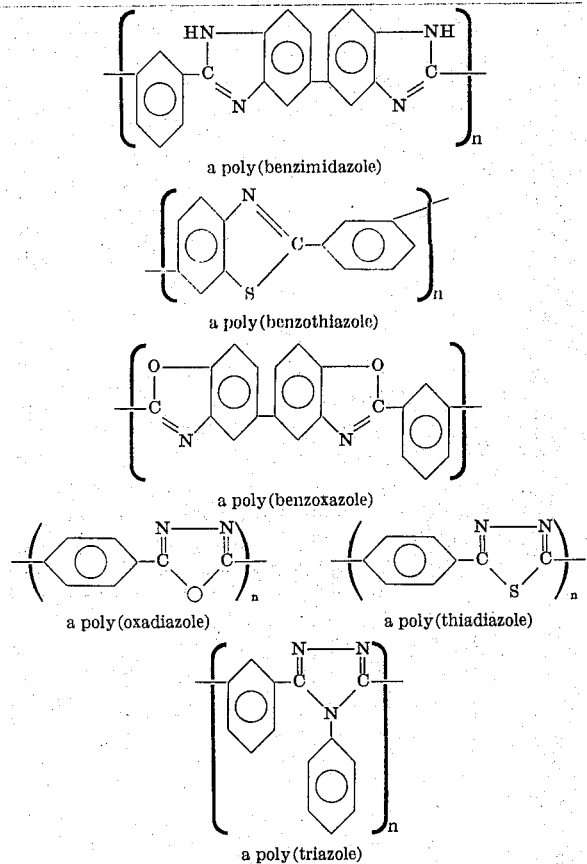

a poly(benzimidazole)

a poly(benzothiazole)

a poly(benzoxazole)

a poly(oxadiazole)    a poly(thiadiazole)

a poly(triazole)

While any of the foregoing polymers and copolymers may be utilized which have the hereinbefore mentioned properties, particularly preferred materials include the following:

1. Polypyromellitimide (polyimide). This material perhaps is the best all-around choice. Not only does it have good to excellent electrical properties, but it produces a very tough and adherent coating without distoring the thin foil, generally aluminum, during the coating and curing operation. This material is non-fusible and thus withstands sufficiently high temperatures to permit the use of high temperature bonding agents such as poly-sulfones which melt at about 300°C. Polyimide coatings may be applied, for example, from a solution of the percursor polymer in N-methyl-2-pyrrolidone. It may be cured, for example at 230°–300°C for 10–60 minutes.

2. Polyamideimide: This material is quite similar to the polyimide in practically all properties. This resin may also be dissolved in N-methyl-2-pyrrolidone. It may be cured at 230°–300°C for 10–60 minutes.

3. Polyethylene terephthalate is also a preferred material. It is soluble in the solvents such as m-cresol, trifluoracetic acid, o-chlorophenol, trichlorophenol and phenol. Dissolved in such a solvent, the material can be applied to the electrode foil in thin films by conventional techniques. The resultant coating is tough, durable and highly flexible and has sufficient chemical resistance to strong mineral acids to withstand "edge clearing" by such agents.

4. Polysulfones and aryl polysulfones: These materials, have good electrical properties and possess sufficiently high melting points, about 300°C; and coatings or films of the materials have sufficient physical integrity and chemical resistance to withstand the required processing operations of coating, edge clearing and bonding. To apply a coating to the electrode foil, it may be done from a solution of the polymer in a solvent, for example, acetophenone, chloroform, cyclohexanone, chlorobenzene, dimethylformamide, dioxane, methylene chloride, tetrahydrofuran and N-methyl-2-pyrrilidone.

5. Aromatic polycarbonate material has thermal, chemical, physical and electrical properties sufficiently good to enable use although its maximum use temperature is about 150°C. The melting point is sufficiently high to permit its use with most of the applicable bonding agents. Solvents are, for example, methylene chloride, m-cresol, tetrahydrofurane, benzene, pyridine, dimethyl-formamide, and chloroform.

For some applications, such as those at higher voltage, it is often preferable to apply two or more coatings, each dried and cured before application of the succeeding coat. This is particularly feasible in the case of the polyimides and polyamide-imides and the like, because after curing, they are usually not very soluble in the coating solution in applying successive coats.

After the metal foil has been coated with a suitable solution of the polymeric material, the next step in the process is to dry and cure the coating material so that it is firmly bonded to the electrode foil. This is nearly always done at elevated temperatures. The time and temperature for curing will depend upon the particular coating material (exemplary temperatures and times are given above).

Following the curing operation, the next step is to slit at least the edges of a single strip in order to expose the electrode metal foil at both edges of the composite. It may often be more practical to coat and cure a relatively wide foil, for example, 12 inches wide, and then gang slit this composite into several individual strips, for example, 1 inch widths.

After slitting, the next step is the "edge clearing" of one edge of the dielectric coated foil. This constitutes the dissolution of one edge of the metal foil, generally aluminum, so that the resulting edge is recessed a few thousandths to a small fraction of an inch between the two dielectric coatings. Edge clearing increases the distance from the recessed edge of one electrode to the non-recessed edge of the adjacent foil of the opposite polarity and from the metallization applied to the end of the capacitor for termination.

Figure 2:
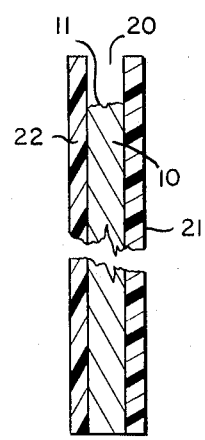
FIG. 2 is a view of the coated foil of FIG. 1 after one edge of the coated foil has been cleared.

In FIG. 2, the edge 20 has been cleared between dielectric coatings 21 and 22.

Figure 5:
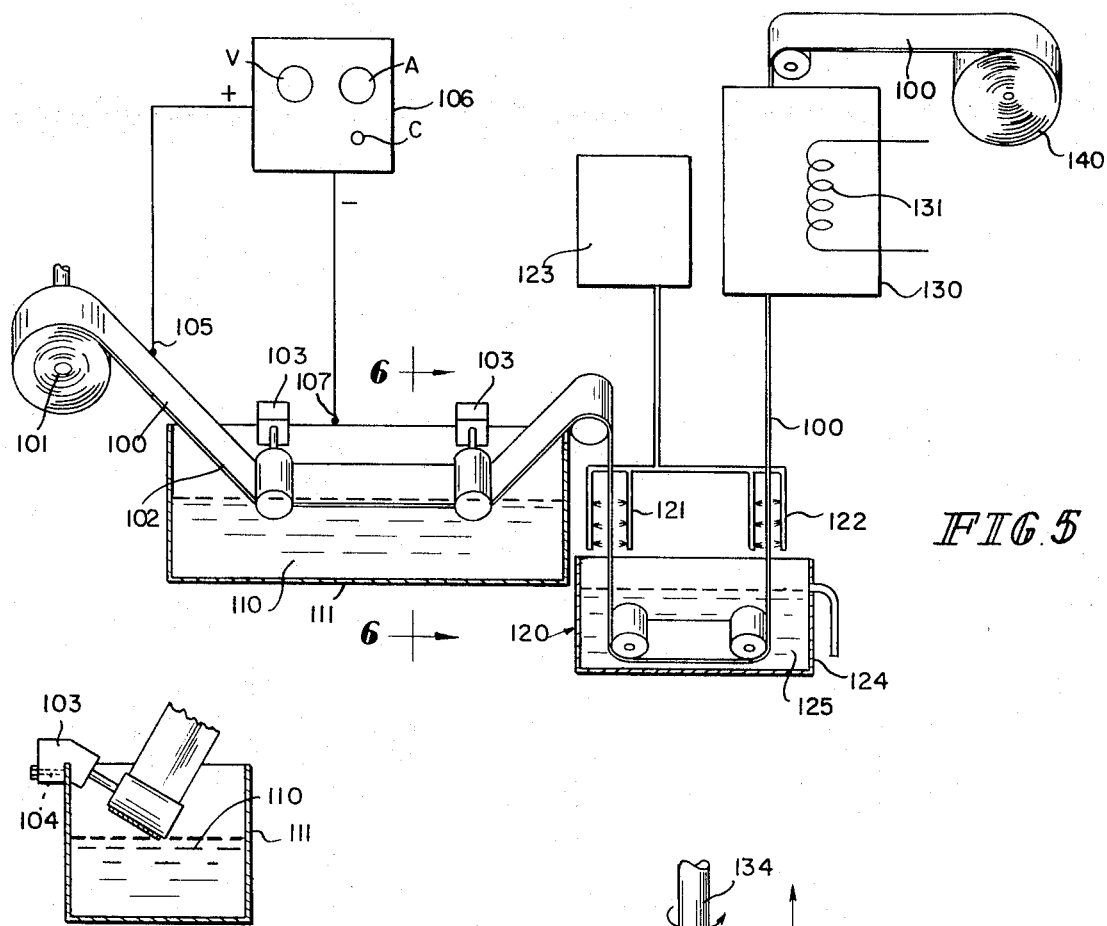
FIG. 5 is a schematic view of process steps to be carried out according to the process of the invention.
Figure 6:
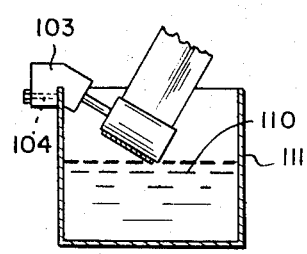
FIG. 6 is a view along the line 6—6 in FIG. 5.

Edge clearing is done by use of rather strong dissolving agents for the electrode metal foil. Since the foil is nearly always aluminum, hydrochloric acid or an alkali metal hydroxide such as NaOH or KOH are acceptable materials. These can be used since virtually all the preferred dielectric coatings are highly resistant to chemical attack. These reagents attack aluminum quite vigorously either chemically or electrochemically. It is only necessary to immerse one edge of the coated and slit foil in a solution of one of these reagents for sufficient time to dissolve away the edge of the metal foil to the desired depth, thus leaving the edge of the dielectric coatings to protrude beyond the edge of the foil. For example, as shown in FIG. 5, the operation may be carried out by unwinding the strip 100 from a roll 101 and passing one edge 102 through the clearing solution 110 in a container 111 followed by a cleaning rinse at 120. An optional dry at 130 and rewind at 140 may also be carried out as shown in FIG. 6. The strip is supported in the bath at an angle, for example, with one or more cantilever supports 103 which which are adjustable at 104 as to height and angle to insure that edge 102 is cleared.

Figure 8:
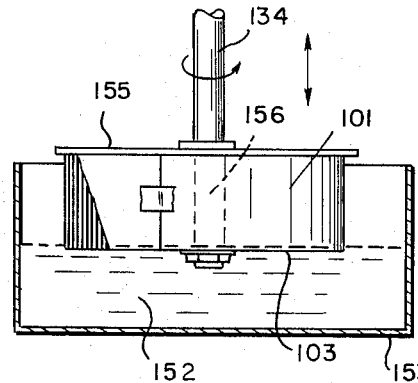
FIG. 8 is an alternative method of carrying out the edge clearing step in accordance with the present invention.

A more expeditious method is to conduct the clearing operation without unwinding from the roll. This may be done, for example, as illustrated in FIG. 8 by immersing one side 102 of the roll of foil 101 in a solution 152 of one of the above reagents in a container 153. In this method, it is advantageous to rotate the roll by means of driven shaft 154 at a moderate speed such as from 10 to 100 revolutions per minute to sweep away the bubbles of hydrogen gas formed by the reaction and to bring fresh reagent solution to the foil edge. This is particularly necessary during the latter stages of the process when the foil edge is substantially recessed between the dielectric coatings. This also insures a uniform depth of clearing. In the case of edge clearing in the roll form, the top side of the roll is held firmly against a cerrated disc 155 by means of a bolt through the hole 156 in the center of the roll.

After dissolution of the foil edge has progressed to the desired extent, the roll is thoroughly rinsed in distilled or deionized water to remove the reagent. A more complete rinsing may be required and this can be accomplished by unwinding the coated and edge-cleared foil from the roll and passing this through successive distilled or deionized water rinses, for instance using one or more series of jets 121, 122 fed from supply container 123, shown in FIG. 5, with or without a rinse in a solution 125 in a container 124, then dry 130, preferably with heating means 131, and rewind 140. This operation may be combined with the operation of applying the bonding agent described hereinafter.

The edge clearing operation may be accelerated by electrochemical dissolution of the foil edge, or by a combination of chemical and electrochemical dissolution. This is accomplished by making electrical contact with the edge of the foil which is not to be dissolved away (105) in FIG. 5 and immersing the other edge in the solution. The reagents mentioned above are also the best choices for the electrochemical process. The foil is made anode (+) by connecting the foil contactor to the positive terminal of a direct current power supply 106. A cathode (−) electrode 107 is positioned in the reagent solution containing the foil which is to be dissolved away. The electrode is connected to the negative terminal of the power supply 106. In the case of the alkaline reagents, the container 111 may be made of iron or stainless steel and this can serve as the cathode in which case the container is connected to the negative terminal of the power supply. These metals, however, are severely attacked by the hydrochloric acid reagent; therefore, other materials must be used if this reagent is employed for the process. In this case, a copper cathode container is satisfactory; or a glass or suitable plastic container may be used. Since these later materials are non-conductors of electric current, a separate cathode must be used in the solution; copper or carbon are satisfactory materials.

Figure 7:
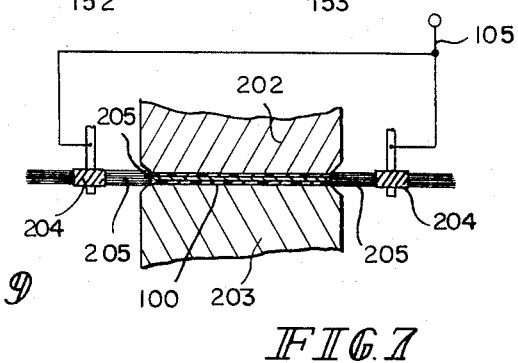
FIG. 7 is a view of the method of contacting the strip in FIG. 5.

In the continuous process, electrical contact may also be made to both edges of the foil by means such as by pulling it past metal containing members such as 204 in FIG. 7 having contacting material 205, for example, metal wool or a fine wire brush. The coated foil is supported, for example, by light pressure as by insulating blocks or rollers 202 and 203 so as not to damage the edge.

Figure 12:
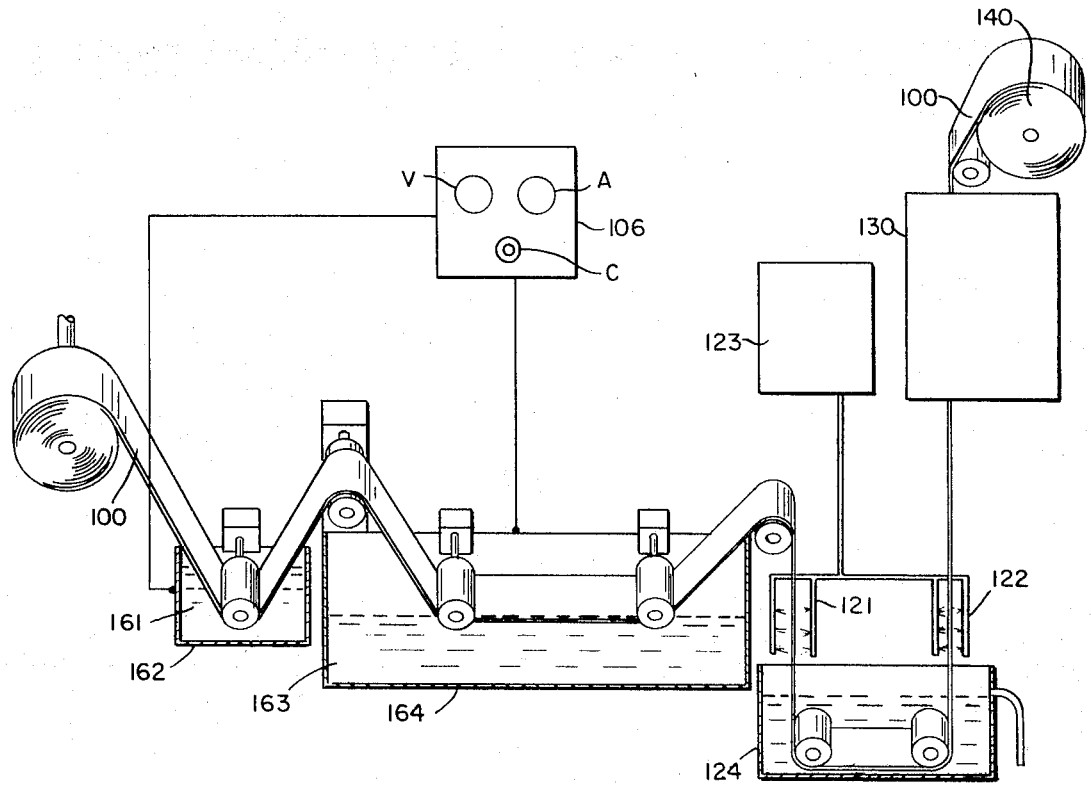
FIG. 12 is a schematic view of process steps for edge clearing by the electrolytic method.

A more practical means of contacting the foil is by a conductive solution. While there are many solutions which can be used, examples are chlorides, sulfates, nitrates, and phosphates of alkali metals and ammonium. By this method, as shown in FIG. 12, the foil is passed thru the contacting solution 161 in a small container 162 constructed of a suitable metal or carbon, then thru the edge clearing solution 163 in a separate container 164. The two containers are electrically isolated from each other. In operation, the contacting solution container 162 is charged anodically (+) while the edge clearing container 164 is charged negatively (−) from the same power source. Upon closing the circuit, current enters the foil edges in the contacting solution 161 and traverses down the foil, then thru the edge clearing solution 163 to its container 164. In effect, the foil is subjected to a bi-polar condition, being cathodic in the contacting solution and anodic in the edge clearing solution.

The applicable range of temperature is from about 25°C to boiling with a preferred range of about 35°C to 75°C.

Sufficient voltage should be applied to give about one half to two amperes per linear foot of length of foil. An appropriate control is provided on the power source 106, as well as a voltometer V and an ammeter A indicated schematically in FIGS. 5 and 12 to control conditions in the bath during edge clearing. After edge clearing, rinsing with water and drying preferably follow, as described above in regard to FIG. 5.

In carrying out the edge clearing, it has been found best to employ conditions which will effect a rather rapid rate of dissolution of the foil edge. Although a slow rate can be employed, such as by the use of weak solutions at room temperature, the time required is not only long but frequently the depth of foil dissolution is not uniform. It has been found that under these conditions the initial rate of dissolution may be satisfactory, but this drops to a slow rate. It is felt that as the foil edge is dissolved away the free-hanging or unsupported edges of the dielectric film collapse together and cover the foil edge to inhibit further access of the reagent to the foil. Also, in the case of the electro-chemical dissolution, the current drops to a very low value. This is evidence that the edges of the dielectric come together to block or inhibit the flow of electric current to the edge of the foil. When aluminum is dissolved chemically by hydrochloric acid or by the alkali metal hydroxides, hydrogen gas is liberated. It is felt that by selecting conditions whereby the reaction rate is moderately high, the copious evolution of hydrogen gas emerging from the edge of the foil outward between the free edges of the dielectric films will keep them apart to afford free access of the reagent to the foil edge aided by the turbulence produced in the reagent.

It is to be understood that in addition to aluminum a wide variety of metals and alloys may be edge cleared including, for example, tantalum, titanium, niobium, copper and alloys of these metals.

It has been found that a range of concentration of 1 – 30 percent HCl or NaOH or KOH in water is useful with a preferred range of 10 percent to 25 percent.

As one example of the clearing process, an aluminum foil 0.0005 inch thick having a dielectric coating of polypyromellitimide on both sides having thicknesses of 0.00025 inch each, required 8 minutes to dissolve the edge of the foil to a depth of about one thirty-second inch using a solution of 10% KOH at 50°C.

In another example, using the same type of coated foil, it required 3 minutes to dissolve the edge of the foil to a depth of about one thirty-second inch using a combination chemical and electrochemical dissolution. In this case, the reagent was an 18 percent solution of HCl at 50°C in which the foil was made anodic and the electric current was maintained at 25–35 milliamperes per linear inch of foil edge.

Figure 3:
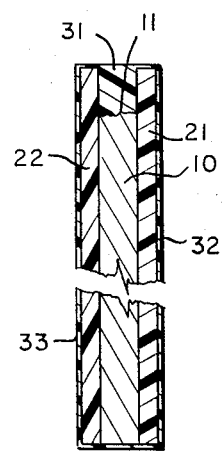
FIG. 3 is a view of the edge cleared foil of FIG. 2 after application of a bonding agent to both sides and to the edge cleared portion.

The next step in the process is to apply a bonding agent to the surfaces of the coated foil which are to be bonded together. As shown in FIG. 3, both dielectric layers 21 and 22 may be coated with bonding agent as indicated at 31, 32 and 33.

This results in virtual elimination of corona at the higher voltages between the plates and provides for a rigid construction. Also, the bonding agent fills in between the edges of the two dielectric coatings at the edge where the foil has been "cleared" as indicated at 31 in FIG. 3 to bond these together and cover the edge 11 of the electrode foil 10 to provide for insulation and protect this electrode from receiving spray metallization for terminal attachment.

In general, a bonding agent separate from the dielectric coating will be used. Applicable bonding agents include materials which have good electrical properties, are at least somewhat adhesive to the dielectric coating employed without substantially adversely affecting same, will withstand rather broad temperature ranges and will be somewhat rigid upon curing.

Preferably, the bonding agent is applied as a liquid without the use of a solvent, then converted to a solid in a final operation by curing under mechanical pressure and/or heat.

Suitable bonding agents include silicon base polymers such as silicone coating resins, and solventless silicone compositions and polysiloxane resins; epoxy resins optionally with curing additives; addition type polyamide and certain thermoplastic materials including the polysulfones and the polyisobutylenes; vinyl plastisols; and polyurethanes.

Polysiloxanes are suitable for use as bonding agents. They are commercially available as liquids, solids, gels and solutions of solid or semi-solid resins. Their preparation and use have been the subject of much patent and other literature, as has their curing agents and processes. One common method of preparation consists of condensing together one or more hydrolyzable silane monomers to give a structure simply and generally depicted below:

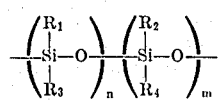

where the R-groups may be varied very widely by proper selection of the silane monomers, e.g., 1. alkyl groups, straight chain or branched, particularly the lower alkyls
2. alkenyl groups; e.g. vinyl or allyl, etc.
3. aryls, aralkyl or alkaryl groups; e.g. phenyl, tolyl, benzyl, biphenyl, etc.
4. substituted alkyl; such as halides, hydroxyl, ethers, carboxyl, esters, cyano, nitro, sulfate and the like, e.g. $-CH_2CH_2CHI$, $-CH_2CH_2CH_2CN$, $-CH_2CH_2CF_3$, etc.
5. substituted aryl; such as halides, hyrdroxyl, ethers, carboxyl, esters, cyano, nitro, sulfate and the like, e.g. $-C_6H_4F$, $-C_6H_4OCH_3$, $C_6H_3Cl\ NO_3$, etc.
6. silane hydrogen; i.e. $-H$
7. hydroxyl groups; i.e. $-OH$
8. ether group $-OR$ where R is e.g. alkyl A balance of variably predictable properties is obtained by varying these R-groups according to known procedures. The groups in 1), 2) and 3) are essentially nonpolar and result in polymers having low dielectric constants (K=2–3, e.g.) and low loss factors (DF= 0.001, e.g.). Hence, they do not contribute markedly to any special or abnormal electrical effects, but they may be varied to give different handling characteristics in the fusible state, and physical properties in the cured state.

Groups 4) and 5) are generally polar, and may be used to give special capacitance effects, such as higher capacity, though usually with concomitant higher loss factor.

Of particular suitability to use in this application are the polysiloxanes commercially available as coating and/or laminating resins. In these, some silanol groups are present on the chain, which may be represented very generally by,

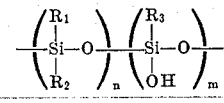

the R-groups being chosen from 1) through 6) above. The average length of the chain $(n+m)$, the degree of branching, and the hydroxyl content of the polymer are determined by the composition of the monomeric silane mix in the initial condensation, and by the after treatment given the condensate, as is well known to those skilled in the art.

In the state usually supplied, these polysiloxane resins are soluble and fusible. They may be crosslinked by heating, with or without a catalyst to speed up the reaction, into an insoluble, infusible resin mass. This crosslinking process is usually attributed to splitting out a molecule of water from two inter-chain hydroxyl groups forming a $-Si-O-Si-$bridge between chains as shown below:

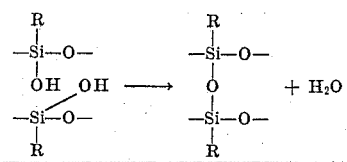

With higher hydroxyl contents (generally lower R/Si ratio), this reaction proceeds more rapidly and to a greater extent, giving a higher crosslink density and stiffer product. The ratio of R group to Si atoms (R/Si) is used to describe in a very average manner, the degree of branching of the polymer and the hydroxyl content, both generally being higher as the R/Si decreases. Suitable R/Si ratios run from 1 to under 3. Preferred resins have a R/Si ratio of about 1.3 to about 1.9, and the preferred R groups are combinations of methyl and phenyl with a phenyl/methyl ratio of 0.1 to 0.9. A resin found to be very suitable has an R/Si of about 1.4 and a phenyl/methyl of about 0.3. The fully cured resins have excellent electrical and thermal properties, and are especially valuable for use as bonding materials because they have acceptable low melt viscosity before hardening and they adhere very well to most dielectric coatings on the electrode foils.

A wide variety of other silicon-containing polymers, other than polysiloxane may also be used. These include: 1) the heterosiloxanes, where the siloxane chain is interrupted with metaloxane groups, e.g.

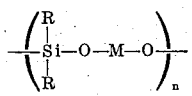 where M may be 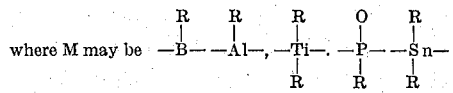

and the like; and R selected from 1 through 8, above (2) polysilanes. e.g. 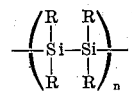

(3) polysilazanes. e.g. 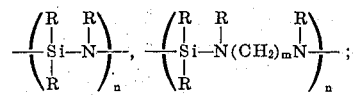

(4) polysilthianes. e.g. 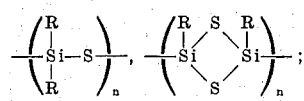

(5) polysilalkylenes. e.g. 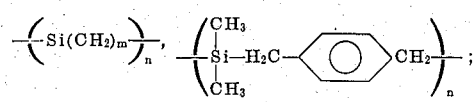

(6) polysilarylenes. e.g. 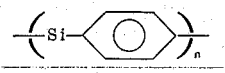

or copolymers of these with each other, or with true polysiloxanes. Ladder polymers may also be used which are prepared by combining these different types of bonds; e.g.

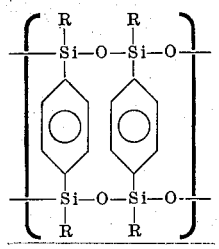

In addition to the above many polymers are modified with siloxane resins or compounds to lend increased moisture resistance and, often, increased temperatures capability. This is usually accomplished by reacting a functional group on the polymer chain, e.g. hydroxyl, with a reactive group on the siloxane e.g.

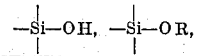

etc. Thus, there are available, for example, siloxane-epoxy resins, siloxane-alkyds, siloxane-phenolics and the like, the enhanced properties of which may render the base polymer more readily usable as a bonding agent.

More exotic polymers are available employing silicon atoms as part of the chain; e.g. the ladder polymer poly(phenylsilsesquioxane);

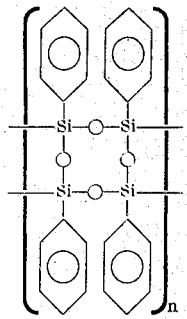

poly (m carboranylenesiloxane):

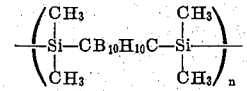

and poly(disiloxanebenzimidazole):

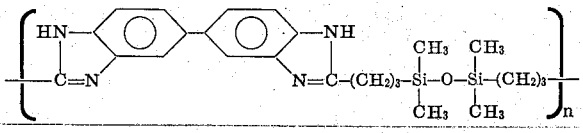

Epoxy resins react to give cured systems with most compounds containing a plurality of active hydrogen groups, such as amines, carboxyls, carbinols, phenols, mercaptans, and the like. They become chemically bound into the crosslinked resin structure. Of the more common hardeners mention should be made of:

1. amines, both aliphatic and aromatic, e.g. the aliphatic series ethylene diamine through tetraethylene pentamine; aromatic amines such as metaphenylene diamine and methylenedianiline.

2. anhydrides, e.g. phthalic-, maleic-, and methyl-3, 6-endo-methylene-tetrahydrophthalic anhydride; pyromellitic-, cyclopentane- and benzophenone-dianhydrides; dodecenylsuccinic anhydride, polyazeleic-polyanhydride, and the like;

3. flexibilizing hardeners, such as polyamides (Versamids), polysulfides (Thiokols), dimer and trimer acids, the last two anhydrides mentioned above, and the like.

In general, hardeners are used at or near the stoichiometric ratio of active hydrogen to oxirane ring. Epoxy catalysts are usually differentiated from the hardeners given above, in that the catalysts promote the epoxide-epoxide reaction without necessarily entering the polymer chain themselves and are used in lesser amounts, e.g. perhaps 0.1–5 percent by weight. The more common are Lewis acids and bases, and adducts thereof, e.g. borontrifluoride and its monoethylamine adduct, and tertiary amines such as piperidine and 2, 4, 6-tris (dimethylolamino) phenol. These catalysts often provide latent curing systems; e.g. stable at room temperature, but active hot.

Activators may be used to promote the reaction between the epoxy resin and the hardener, most commonly to speed the reaction between glycidyl epoxy groups and anhydrides. Lewis bases, such as those mentioned above or benzyldimethyl amine, are commonly used. Phenolic moieties often enhance the somewhat sluggish reaction between aromatic amines and epoxy resins. The amino hydrogens on the aliphatic amines are generally very reactive to glycidyl epoxy groups, even at room temperature, and require no activator. In fact, their reaction is often purposely retarded, by employing them as an adduct of the epoxy resin or as the salt of a weak acid, such a cyclohoxanecarboxylic, in order to obtain a reasonable pot life.

Certain epoxy resin systems are particularly preferred as bonding agents. They are usually discussed in terms of 1) the resin and combinations thereof, 2) the hardeners or catalysts, 3) activators which may promote the resin-hardener reaction, and 4) modifiers which change the electrical and/or physical properties of the cured system.

Some of the more common resins, thoroughly discussed in patent and other literature, are 1. diglycidyl ethers of Bisphenol A (DGEBA);

2. polyglycidyl ethers of phenolic resins (PGEPR);

3. various compounds termed cycloaliphatic oxirane resins, e.g. vinyl cyclohexanediepoxide (VCHDE) and bis (3, 4 - epoxy-6-methyl cyclohexylmethyl) adipate (BEMCA);

4. epoxidized unsaturated polymers, e.g. epoxidized butadiene-styrene copolymers (EBSCP);

5. epoxidized natural products e.g. epoxidized soybean oil (ESBO) They are all characterized by having more than one oxirane rings present. Simplified representative structures are given below:

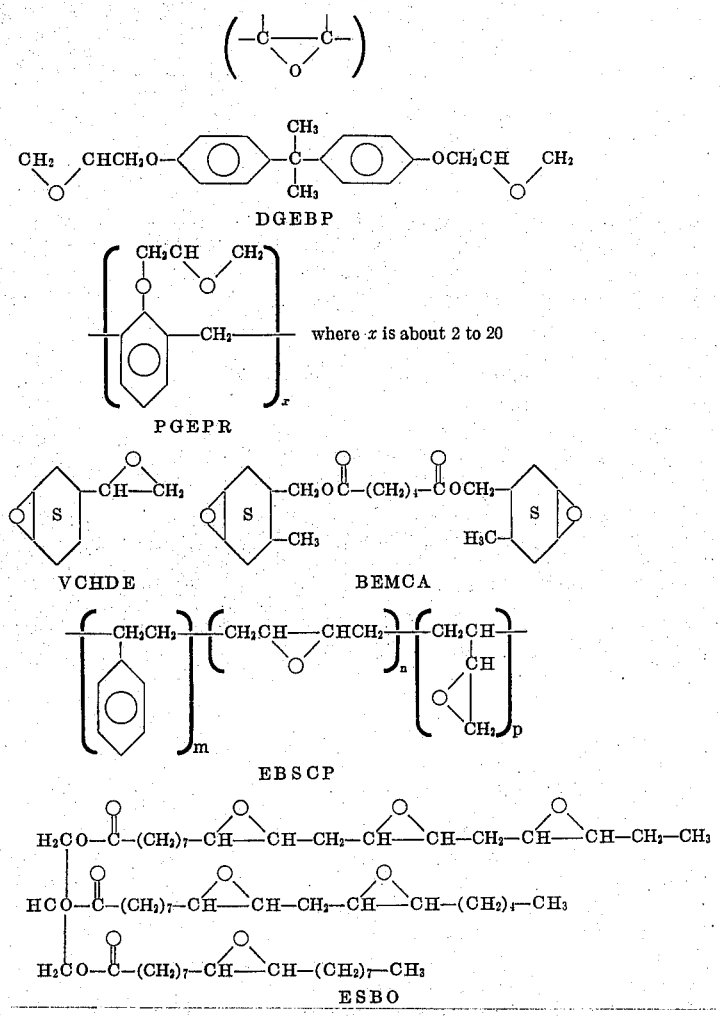

In this application, n, m, and p designate that the polymer chain is of indefinite length, containing the units parenthesized. However, the values of n, m, and p in the formulas are generally at least about 100 more preferred at least about 1,000, still more preferably at least about 5,000 and most preferred at least about 10,000. The usable values will vary considerably between different types of polymers. In general n, m and p should not be so high as to cause processing difficulties, nor so low as to result in structural weakness. Moreover, the values for resinous materials such as certain of the polysiloxanes and epoxy resins may be considerably lower than 100, as is vell known to those skilled in the arts.

6. Polyisobutylene polymers are excellent bonding materials. These are highly paraffinic hydrocarbon polymers, composed at long straight-chain molecules having only terminal unsaturation. Because of this molecular structure, they are relatively inert and resistant to chemical and oxidative attacks and they have excellent electrical properties. The degree of polymerization can be had over a wide range. In the low molecular wiehgt range (8,000–12,000), they are highly viscous tacky semi-solids. In the higher molecular weight range (50,000–150,000), they are tough rubbery solids. They are thermoplastic materials and are further characterized by their high adhesive properties to most materials.

Vinyl plastisols, polyurethanes and related materials may be utilized for bonding for some applications. These materials are attractive in that they do not require a solvent, do not liberate water during curing and are easy to handle.

Some materials posed for use as bonding agents may also be employed as the primary dielectric or foil coating in which case another material must be used as the bonding agent. As an example, polysulfone or polyarylsulfone produces an excellent dielectric coating on the foil. In this case, some acceptable material capable of being applied and processed at a temperature substantially below the softening point of the polysulfone (about 250°C) must be used, such as polyisobutylene, epoxy resins, silicones, etc. As a bonding agent, polysulfone can only be used with very heat resistant dielectric coatings such as polyimide because the processing temperature for polysulfone is rather high.

Of particular interest are materials which can be applied in the liquid state, with or without a solvent, then converted to the fusible solid film stage. In this manner, the foil electrodes having the dielectric film and one edge cleared can be coated with the bonding agent, then converted to the solid stage and then stored for future use. After winding into capacitor devices, the units are pressed between heated platens to liquify the bonding agent and force out all excess material from the structure. Upon heating to a higher temperature or for a prolonged time, the material cures to a solid.

Some preferred bonding agents of the thermosetting type which can be applied and converted to a fusible film are as follows: addition type polyimide resin in a solvent such as dimethyl formamide from which the dried coating can be "B" staged by heating, for example, to 200°C to 250°C for 1 to 10 minutes; silicone coating resins in a solvent (i.e. toluene) applied to the coated foil and dried, for example, at 30°–100°C, and epoxy resins which can be "B" staged.

Figure 13:
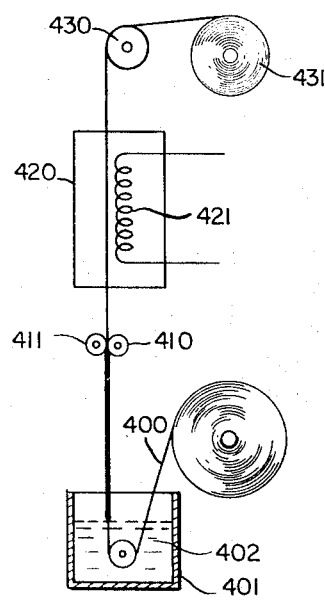
FIG. 13 is a schematic view of an embodiment of the present invention involving applying a bonding agent to a foil having a polymeric dielectric coating thereon.

As one example of this process, as shown in FIG. 13, a coated and cleared foil 400 is pulled through a small container 401 of so-called "B" staging epoxy resin 402, and then between elastomer rolls 410 and 411, to remove excess. The composite then traverses through a heated column or chamber 420 where sufficient heat is provided (by heating means 421) to cause the liquid resin to convert to a solid but fusible film or "B" stage. The so converted foil may then be passed over idler wheel 420 and wound upon mandrel 431. As for example, an aromatic amine type of cure can be used. For instance, 75–125 parts of diglycidyl ether of bisphenol epoxy cured with 20–50 parts of methaphenylene diamine.

By a slight variation of the above process, various thermoplastic polymer bonding materials may be applied to the separate coated foils. Such materials would include, for example, polysulfone, arylpolysulfone, polyethyleneterephthalate, polyisobutylene, polycarbonate, etc. Any of these or other applicable materials when dissolved in a suitable solvent can be applied by techniques similar to that described above, in regard to FIG. 13, except it is only necessary to remove the solvent from the coating by heat before rewinding onto spools for storage. Also, capacitors wound from such members and subsequently radially pressed between heated platens to fuse the bonding agent are preferably cooled while under pressure to solidify the material.

Figure 9:
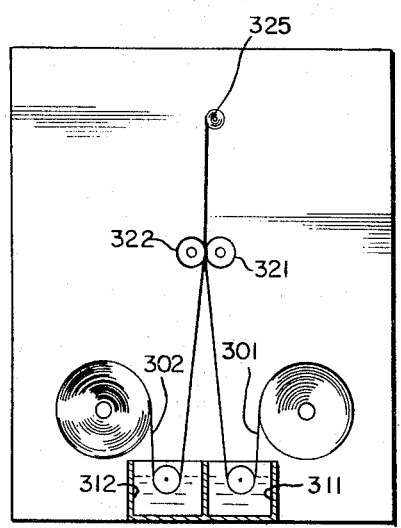
FIG. 9 is a view of the "wet" winding process which may be carried out according to the present invention.

By another process, two of the dielectric coated and edge cleared foils 301 and 302 are traversed through containers 311 and 312 of liquid bonding material as shown in FIG. 9. Upon emerging, are brought together between elastomer rollers 321 and 322 to remove excess material, then they are wound together on a mandrel 325. This is the so-called "wet" winding process and it is applicable only to bonding materials which have no solvent but which have the property of converting to a solid by heating. Such materials would include, for example, epoxy resins and the solventless silicone compositions. Upon completion of the winding operation, the capacitor is preferably radially pressed between heated platens to remove the excess and convert the bonding agent to a solid.

By still another process, the applicable bonding agents may be incorporated into prewound units of two dielectric coated and edge-cleared foils by vacuum impregnation. In this case, also, the bonding agent must be devoid of solvents. Applicable materials are, for example, low viscosity epoxy resins and the solventless liquid silicone compositions. After impregnation, the excess material is drained from the capacitor exterior, followed by heating to convert the bonding agent to a solid. Optionally, they may be radially pressed between heated platens to remove excess material and to cure that which remains in the winding.

After curing, some of the bonding agent may have solidified on the ends of the winding. It is necessary that this be removed sufficiently to expose the non-recessed edge of the foil on each end of the winding. This may be accomplished for example, by a sharp cutter or by abrasion. Termination is made by spray metallization with applicable metals or alloys which bond to the edges of the foil, for example, the Ni-Al composition described in U.S. Patent application, Ser. No. 169,554, filed Aug. 5, 1971.

Following this, the unit is processed in a conventional manner which may include encapsulating by molding, dip coating, and/or assembly in metallic containers, etc.

Figure 4:
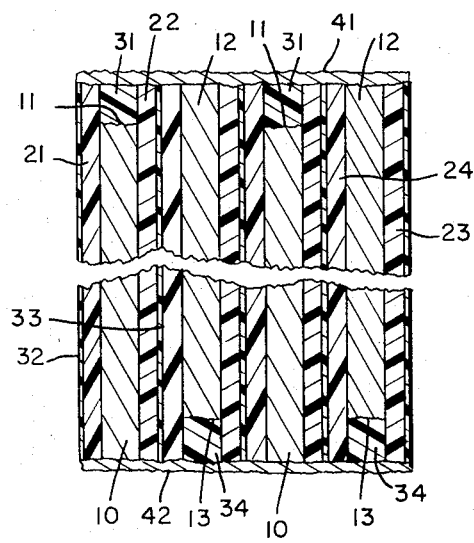
FIG. 4 is a view wherein several layers of the foils of FIG. 3 have been bonded together into an assembly and a termination material applied to the ends of the device.

FIG. 4 shows a terminated unit with electrode foils 10 and 12 having dielectric coatings thereon 21, 22, and 23, 24, and bonding agent 32, 33 on both electrodes with one portion thereof 31 protecting foil edge 11 from shorting and another bonding agent portion 34 protecting foil edge 12 from shorting. A terminating coating, for example, the nickel-aluminum material described in the said Ser. No. 169,554 is applied to both faces as illustrated at 41 and 42.

Figure 11:
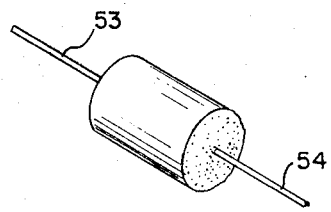

Examples of completed devices are shown in FIGS. 10 and 11. In both devices, leads 51, 52, and 53, 54, respectively, have been applied to terminating coatings such as these shown at 41 and 42 in FIG. 4.

Additional salient features of the capacitor of the invention include:
1. Very high CV product-smaller size.
2. Very broad temperature capability.
3. Radiation resistant.
4. Highly rigid construction.
5. Non-inductive.
6. Strong lead attachment means.
7. Withstands severe shock and vibration.
8. Casing construction not critical.

Although stacked construction is feasible, a wound construction is preferred.

Not only does the coated foil concept provide for virtually any choice of practical dielectric thickness, but furthermore, it offers a lower dielectric material cost particularly in thin dielectric sections. This is particularly true in the case of some of the newer high grade dielectric materials. As an example, a discrete film of polyimide in a thickness of 0.00025 inch costs upwards of $300 per lb., whereas, the material cost of the same applied as a coating of the same thickness is only about $10.00 per lb. (1971 prices).

What is claimed is:

1. A method for making capacitors comprising;
   applying a polymeric dielectric coating to a strip of electrode metal;
   allowing said coating to harden;
   slitting to expose at least one edge of the coated strip;
   edge clearing one exposed edge of said strip;
   winding dry at least two of said strips;
   vacuum impregnating said wound strips with a bonding agent;
   allowing the bonding agent to harden;
   trimming excess bonding agent from each of the winding to expose the alternate uncleared edge of the electrodes;
   attaching a terminating coating to opposite ones of the exposed electrode edges.

2. A method according to claim 1, wherein the impregnated windings are radially pressed after step F.

3. A method according to claim 2, wherein the windings are heated during pressing.

4. A method according to claim 1, wherein a solventless liquid is used selected from the group consisting of solventless silicones and epoxy resins.

5. A method for making capacitors comprising:
   applying a polymeric dielectric coating to a strip of electrode metal;
   allowing said coating to harden;
   slitting to expose at least one edge of the coated strip;
   edge clearing one exposed edge of said strip;
   applying a bonding agent in liquid form to at least one of two strips and said cleared edge;
   converting the bonding agent to a solid but fusible form;
   winding said strips upon a mandrel;
   heating said wound strips to fuse and cure the bonding agent;
   trimming the ends of said winding to expose the alternate uncleared edges of the electrodes;
   attaching a terminating coating to opposite ones of the exposed edges of said electrodes.

6. A method according to claim 5, wherein, after step G, the winding is removed from the mandrel, and is radially pressed and heated to fuse and/or cure the bonding agent.

7. A method according to claim 6, wherein, the bonding agent is a material which is fusible at a temperature below the softening point of said polymeric dielectric coating after step F.

8. A method according to claim 5, wherein the bonding agent is selected from the group consisting of silicone coating resins, "B stage" epoxy reins, "B stage" addition type polyimides, and thermoplastic bonding agents.

9. A method for making capacitors comprising:
   applying a polymeric dielectric coating to a strip of electrode metal;
   allowing said coating to harden;
   slitting to expose at least one edge of the coated strip;
   edge clearing one exposed edge of said strip;
   applying a solventless bonding agent in liquid form to said strip and immediately thereafter winding a pair of said strips upon a mandrel;
   removing the winding from said mandrel and allowing said bonding agent to harden;
   trimming the ends of said winding to expose the alternate uncleared edges of the electrodes;
   attaching a terminating coating to opposite ones of the exposed edges of said electrodes.

10. A method according to claim 9, wherein winding is radially pressed.

11. A method according to claim 10, wherein the winding is heated during pressing.

12. A method according to claim 9, in which the bonding agent is a solventless liquid selected from the group consisting of solventless silicones and epoxy resins.

13. A method of making a capacitor comprising the steps of providing means including a metal foil strip having an exposed metal edge with polymer dielectric means adhered to the metal foil strip, contacting the metal strip to a terminal of an electrical power source and contacting means for dissolving metal to another terminal of the electrical power source, dissolving exposed metal at one edge of the metal foil strip by exposing metal at the edge to the means for dissolving metal and electrical forces to provide a resulting metal foil edge recessed up to a small fraction of an inch from the edge of the polymer dielectric means, moving at least two of the resulting metal foil means together to provide a body including bonded together alternate layers having a recessed metal foil edge, and attaching electrode means to exposed metal foil edges at opposite ends of the body to provide a capacitor.

14. The method of claim 13, wherein the step of moving at least two of the means together includes winding means to provide a convolutely wound roll.

15. The method of claim 14, including the further step of, prior to attaching electrode means to the opposite ends of the body, radially pressing the wound roll and curing a bonding agent applied to the resulting metal foil means.

16. The method of claim 15, wherein the bonding agent is selected from the group including silicone coating resins, "B stage" epoxy resins; "B stage" addition type polyimides, and thermoplastic bonding agents.

17. The method of claim 13, wherein the layers of the body are substantially flat.

18. The method of claim 13, wherein the step of dissolving exposed metal of the metal foil strip includes exposing an edge of the metal foil strip to a solution in which the metal is at least partially soluble and in which the polymer dielectrical means is substantially insoluble, and maintaining the edge in contact with the solution for a length of time to dissolve the exposed edge of the metal foil strip.

19. The method of claim 13, wherein the polymer dielectric means is on opposite sides of the metal foil strip.

20. In a method of making a capacitor, the steps of contacting a polymer coated metal strip having an edge of exposed metal to a terminal of an electrical power source and contacting means in which metal of the polymer coated metal strip is at least partially soluble to another terminal of the electrical power source, exposing metal at the metal edge of the polymer coated metal strip to the means to cause removal of metal at the exposed edge in a controlled manner by the cooperative association of the means and electrical forces, removing the edge of the polymer coated strip from the means after a determined amount of metal is removed from the edge of the polymer coated metal strip, winding together two of the treated polymeric coated strips to provide a convolutely wound roll with removed metal edges at opposite ends of the wound roll, and impregnating the wound roll with a bonding agent to bond together adjacent polymer coated metal strips.

21. In a method of making a capacitor, the steps of contacting a polymer coated metal strip having an edge of exposed metal to a terminal of an electrical power source and contacting means in which metal of the polymer coated metal strip is at least partially soluble to another terminal of the electrical power source, exposing metal at the metal edge of the polymer coated metal strip to the means to cause removal of metal at the exposed edge in a controlled manner by the cooperative association of the means and electrical forces, removing the edge of the polymer coated strip from the means after a determined amount of metal is removed from the edge of the polymer coated metal strip, applying a bonding agent to a length of a treated polymer coated strip, and winding together the strip having bonding agent applied thereto and another treated polymer coated metal strip to provide a convolutely wound roll of bonding together treated polymer coated metal with removed edges at opposite ends of the wound roll.

* * * * *